United States Patent
Sato et al.

(10) Patent No.: US 12,449,812 B2
(45) Date of Patent: Oct. 21, 2025

(54) MOVING-BODY PATH CALCULATION DEVICE

(71) Applicant: NEC Corporation, Tokyo (JP)

(72) Inventors: Natsuhiko Sato, Tokyo (JP); Shinya Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 18/034,014

(22) PCT Filed: Oct. 30, 2020

(86) PCT No.: PCT/JP2020/040901
§ 371 (c)(1),
(2) Date: Apr. 26, 2023

(87) PCT Pub. No.: WO2022/091367
PCT Pub. Date: May 5, 2022

(65) Prior Publication Data
US 2023/0393581 A1    Dec. 7, 2023

(51) Int. Cl.
*G05D 1/00*    (2024.01)
(52) U.S. Cl.
CPC ......... *G05D 1/0217* (2013.01); *G05D 1/0272* (2013.01)
(58) Field of Classification Search
CPC ............... G05D 1/0217; G05D 1/0272; G05D 2109/10; G05D 2111/10; G05D 1/225; G05D 1/646; G05D 1/243; F02M 1/02
See application file for complete search history.

(56) References Cited

U.S. PATENT DOCUMENTS

| 2010/0228420 A1* | 9/2010 | Lee ........................ B62D 1/28 701/26 |
| 2014/0058656 A1* | 2/2014 | Chen .................. B62D 15/0285 701/400 |

(Continued)

FOREIGN PATENT DOCUMENTS

| DE | 102014014968 A1 * | 4/2016 | ........... G01B 11/002 |
| JP | H10-111138 A | 4/1998 | |

(Continued)

OTHER PUBLICATIONS

Lumen Learning, "Arc Length" Module 3 of Calculus III by Lumen Candela. https://courses.lumenlearning.com/calculus3/chapter/arc-length/. Adapted for web from Strang, Gilbert, and Edwin "Jed" Herman. Calculus, vol. 3 (vol. 3). 1st ed. OpenStax College, 2016 (Year: 2016).*

(Continued)

*Primary Examiner* — Shardul D Patel
*Assistant Examiner* — Rose Ridder

(57) ABSTRACT

To calculate a path of movement of a moving body, a moving-body path calculation device includes: a deviation obtaining means that obtains a deviation of the moving body in a direction perpendicular to an ideal route; and a path calculating means that calculates the path of the movement of the moving body on a basis of a composite parameter including a parameter indicating the deviation of the moving body which deviation has been obtained by the deviation obtaining means.

6 Claims, 9 Drawing Sheets

(56) References Cited

U.S. PATENT DOCUMENTS

| | | | | |
|---|---|---|---|---|
| 2015/0346728 | A1* | 12/2015 | Peake | A01B 69/008 |
| | | | | 701/23 |
| 2017/0060137 | A1* | 3/2017 | Shitamoto | G05D 1/0221 |
| 2017/0247032 | A1* | 8/2017 | Lee | B60W 30/12 |
| 2022/0324443 | A1* | 10/2022 | Chen | B60W 50/0097 |

FOREIGN PATENT DOCUMENTS

| | | | |
|---|---|---|---|
| JP | H10-254505 A | | 9/1998 |
| JP | 2000-089826 A | | 3/2000 |
| JP | 2003022130 A | * | 1/2003 |
| JP | 2006-018675 A | | 1/2006 |
| JP | 2007007803 A | * | 1/2007 |
| JP | 2007-304713 A | | 11/2007 |
| JP | WO2012/164691 A1 | | 7/2014 |
| JP | 2017-151687 A | | 8/2017 |
| JP | 2020-009085 A | | 1/2020 |
| WO | 97/036217 A1 | | 10/1997 |

OTHER PUBLICATIONS

International Search Report for PCT Application No. PCT/JP2020/040901, mailed on Jan. 19, 2021.

JP Office Action for JP Application No. 2022-558770, mailed on May 21, 2024 with English Translation.

* cited by examiner

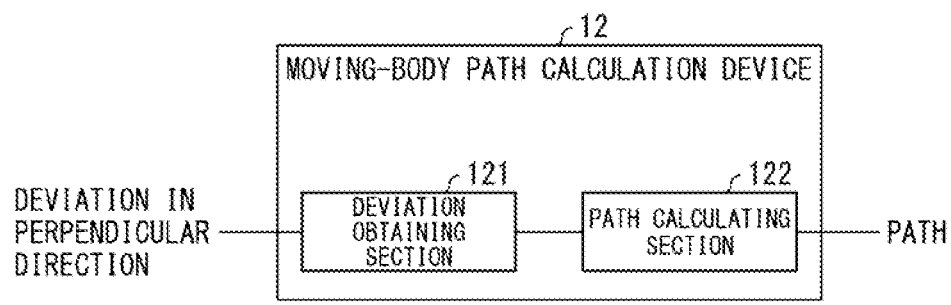
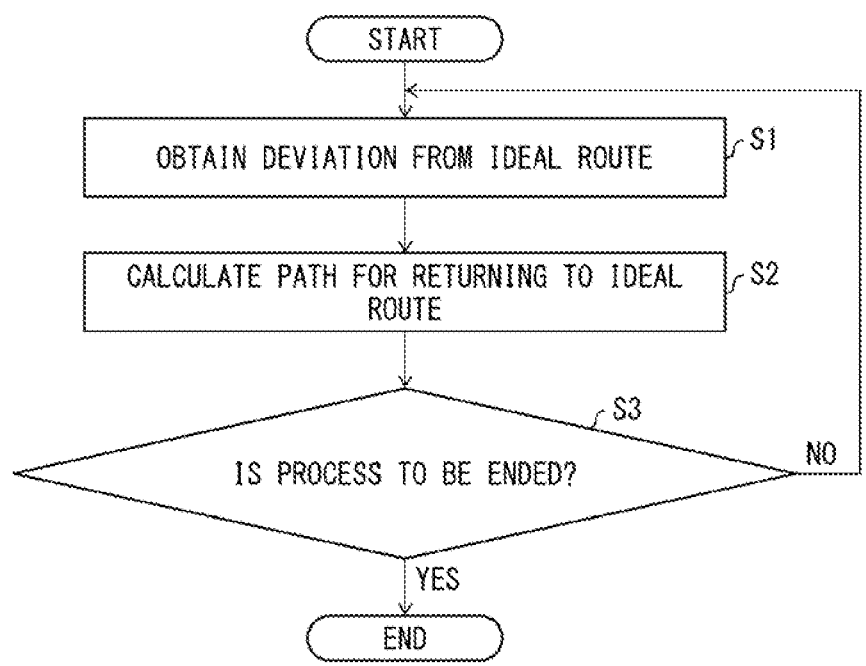

MOVING-BODY PATH CALCULATION DEVICE

This application is a National Stage Entry of PCT/JP2020/040901 filed on Oct. 30, 2020, the contents of all of which are incorporated herein by reference, in their entirety.

TECHNICAL FIELD

The present invention relates to a technical field of a moving-body path calculation device that calculates a path of movement of a moving body and the like.

BACKGROUND ART

There has been developed a technique for controlling traveling of a moving body such as a transfer robot and/or a transfer vehicle. Examples of such a technique include the techniques disclosed in Patent Literatures 1 and 2. Patent Literature 1 relates to an operation control method for controlling a motion of an object that moves along a target route. This operation control method obtains a target driving operation amount on the basis of (a) a distance between a target route and a moving mechanism and (b) a target moving speed, and determines a target moving direction on the basis of the target driving operation amount thus obtained.

Patent Literature 2 discloses a moving-body route control device that includes a position identifying device, a storage device in which a scheduled route of a moving body is stored together with moving directions and speeds at various points therein, a computing device, and a driving control device. This moving-body route control device is configured as follows. That is, on the basis of a moving direction and a speed at a corresponding point that is on the scheduled route and that is separated from a present position by a shortest distance, the computing device sets, for the moving body, a moving direction and a speed that gradually getting closer to these reference values. Further, on the basis of the direction and speed thus set, the driving control device controls movement of the moving body so as to cause the moving body to return to the scheduled route.

CITATION LIST

Patent Literature

[Patent Literature 1]
  International Publication No. WO 1997/036217
[Patent Literature 2]
  Japanese Patent Application Publication Tokukai No. 2000-089826 (Publication Date: Mar. 31, 2000)

SUMMARY OF INVENTION

Technical Problem

The operation control methods disclosed in Patent Literatures 1 and 2 have a problem in terms of calculation of a suitable route.

An example aspect of the present invention was made in consideration of the above-described problem, and has an example object to provide a technique for calculating a suitable path of movement of a moving body.

Solution to Problem

A moving-body path calculation device in accordance with an example aspect of the present invention includes: a deviation obtaining means that obtains a deviation of a moving body in a direction perpendicular to an ideal route; and a path calculating means that calculates a path of movement of the moving body on a basis of a composite parameter including a parameter indicating the deviation of the moving body which deviation has been obtained by the deviation obtaining means.

A moving body in accordance with an example aspect of the present invention includes: a driving means that drives a plurality of wheels; a position detecting means that detects position information of the moving body; a deviation obtaining means that refers to the position information of the moving body detected by the position detecting means and obtains a deviation of the moving body in a direction perpendicular to an ideal route; a path calculating means that calculates a path of movement of the moving body on a basis of a composite parameter including a parameter indicating the deviation of the moving body which deviation has been obtained by the deviation obtaining means; and a control means that obtains routes of the moving body at various times on a basis of the path calculated by the path calculating means, calculates speeds of the plurality of wheels on the basis of the routes, and controls the driving means.

A remote control device in accordance with an example aspect of the present invention includes: a communication means that receives an image of a moving body having been captured and transmits a path of movement of the moving body to the moving body; a deviation obtaining means that refers to the image of the moving body received by the communication means and obtains a deviation of the moving body in a direction perpendicular to an ideal route; and a path calculating means that (a) calculates a path of movement of the moving body on a basis of a composite parameter including a parameter indicating the deviation of the moving body which deviation has been obtained by the deviation obtaining means and (b) causes the communication section to transmit the path.

A moving body system in accordance with an example aspect of the present invention includes: a moving body; a remote control device; and an image-capturing device configured to capture an image of the moving body, the remote control device including a communication means that receives the image of the moving body captured by the image-capturing device and transmits a path of movement of the moving body to the moving body, a deviation obtaining means that refers to the image of the moving body received by the communication means and obtains a deviation of the moving body in a direction perpendicular to an ideal route, and a path calculating means that (a) calculates a path of movement of the moving body on a basis of a composite parameter including a parameter indicating the deviation of the moving body which deviation has been obtained by the deviation obtaining means and (b) causes the communication means to transmit the path, and the moving body including a driving means that drives a plurality of wheels, a receiving means that receives, from the remote control device, the path of the movement of the moving body, and a control means that obtains, on a basis of the path of the movement of the moving body received by the receiving section, routes of the moving body at various times, calculating speeds of the plurality of wheels on the basis of the routes, and controls the driving section.

A method in accordance with an example aspect of the present invention for calculating a path of movement of a moving body, the method including: obtaining, by a moving-body path calculation device, a deviation of the moving body in a direction perpendicular to an ideal route; and calculating, by the moving-body path calculation device, a path of movement of the moving body on a basis of a composite parameter including a parameter indicating the deviation of the moving body having been obtained.

A storage medium in accordance with an example aspect of the present invention is a computer-readable storage medium in which a moving-body path calculating program is stored, the moving-body path calculating program causing a computer (a) to obtain a deviation of a moving body in a direction perpendicular to an ideal route and (b) to calculate a path of movement of the moving body on a basis of a composite parameter including a parameter indicating the deviation of the moving body having been obtained.

Advantageous Effects of Invention

According to an example aspect of the present invention, it is possible to calculate a suitable path of movement of a moving body.

BRIEF DESCRIPTION OF DRAWINGS

FIG. 1 is a block diagram illustrating a functional configuration of the moving-body path calculation device 12 in accordance with a first example embodiment of the present invention.

FIG. 2 is a flowchart illustrating a moving-body path calculation method in accordance with the first example embodiment of the present invention.

EXAMPLE EMBODIMENTS

First Example Embodiment

Figure 3:
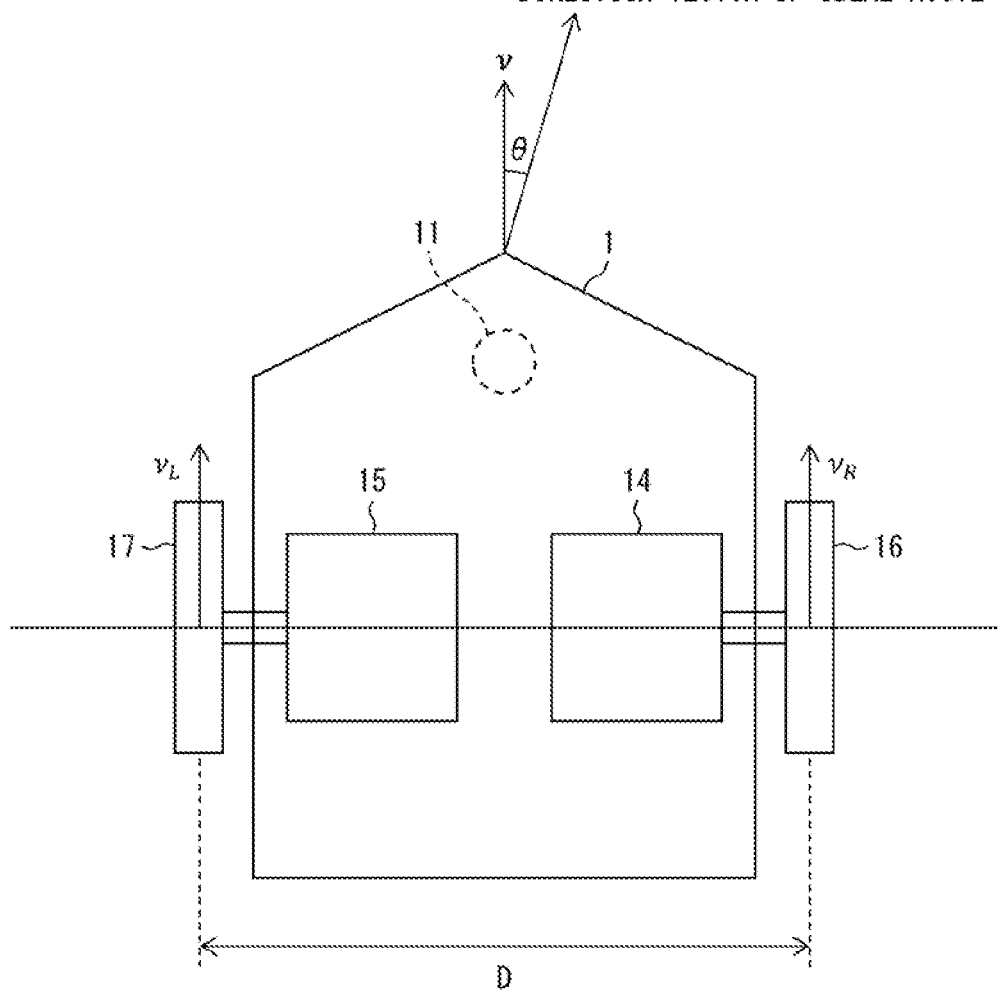
FIG. 3 is a view schematically illustrating a configuration of a moving body to which the moving-body path calculation device discussed in the first example embodiment is applied.

The following description will discuss an example embodiment of the present invention with reference to the drawings. The present example embodiment is a basic form of the later-described example embodiments.

(Configuration of Moving-Body Path Calculation Device)

The following will describe, with reference to FIG. 1, a configuration of a moving-body path calculation device 12 in accordance with the present example embodiment. FIG. 1 is a block diagram illustrating a functional configuration of the moving-body path calculation device 12 in accordance with the first example embodiment of the present invention. The moving-body path calculation device 12 includes a deviation obtaining section 121 and a path calculating section 122.

The deviation obtaining section 121 obtains a parameter y indicating a deviation of a moving body from an ideal route (for example, a direction perpendicular to a straight-line route). An example of the deviation of the moving body in the direction perpendicular to the ideal route is a length of a perpendicular line extending from the moving body to the ideal route.

For example, the deviation obtaining section 121 may be configured to obtain, in addition to the parameter y, the square of a speed of a right wheel of the moving body, the square of a speed of a left wheel of the moving body, and the like. In the example indicated above, the ideal route is a straight-line route. However, the present example embodiment is not limited to this. The ideal route may be a curved line or a line including a curved line and a straight line. In a case where the ideal curved line includes a curved line, the curved line may be locally approximated to a straight line, and a deviation of the moving body in a direction perpendicular to the straight line thus approximated may be used as the parameter y.

On the basis of a composite parameter including the parameter y indicating the deviation of the moving body which deviation has been obtained by the deviation obtaining section 121, the path calculating section 122 calculates a path of movement of the moving body. Here, the path of the movement of the moving body refers to routes (coordinates) of the moving body obtained at various times until the moving body returns to a target route. However, this is not limitative. For example, the path of the movement of the moving body may be a route of the moving body in a certain period within a period until the moving body returns to the target route.

One example of the composite parameter including the parameter y can include, in addition to the parameter y, a parameter T indicating a period of time (required time) required for the moving body to return to the ideal route, a parameter θ indicating an angle between the ideal route and the moving direction of the moving body, and/or the like. However, the present example embodiment is not limited to this.

As discussed above, the moving-body path calculation device 12 in accordance with the present example embodiment employs the configuration in which the path of the movement of the moving body is calculated on the basis of the composite parameter including the parameter y indicating the deviation of the moving body. Thus, with the moving-body path calculation device 12 in accordance with the present example embodiment, it is possible to attain the effect of suitably calculating the path of the movement of the moving body, the path including the routes of the moving body at various times.

(Flow of Moving-Body Trajectory Calculation Method)

The following will describe, with reference to FIG. 2, a flow of a moving-body path calculation method in accordance with the present example embodiment. FIG. 2 is a flowchart illustrating a moving-body path calculation method in accordance with the first example embodiment of the present invention. First, the deviation obtaining section 121 obtains the parameter y indicating a deviation of the moving body in a direction perpendicular to the target route (S1).

Next, on the basis of an index expressed by the composite parameter including the parameter y indicating the deviation of the moving body which deviation has been obtained by the deviation obtaining section 121, the path calculating section 122 calculates a path of movement of the moving body (S2).

Lastly, it is determined whether or not the process is to be ended (S3). If the process is to be ended, for example, if traveling of the moving body is to be ended (S3, Yes), the process is ended as it is. If the process is not to be ended (S3, No), the process goes back to step S1 and the subsequent processes are carried out again.

As discussed above, the moving-body path calculation method in accordance with the present example embodiment employs the configuration in which the path of the movement of the moving body is calculated on the basis of the composite parameter including the parameter y indicating the deviation of the moving body. Thus, with the moving-body path calculation method in accordance with the present example embodiment, it is possible to attain the effect of suitably calculating a path of movement of a moving body, the path including routes of the moving body at various times.

Second Example Embodiment

The following description will discuss another example embodiment of the present invention with reference to the drawings. Note that members having identical functions to those of the first example embodiment are given identical reference signs, and a description thereof will be omitted.

The composite parameter can include, in addition to the parameter y indicating the deviation of the moving body, the parameter T indicating the period of time required for the moving body to return to the ideal route, the parameter θ indicating the angle between the ideal route and the moving direction of the moving body, and/or the like.

The path calculating section 122 calculates the path of the movement of the moving body such that the index indicated by the composite parameter takes a minimal value.

In the present example embodiment, the path calculating section 122 uses, as an example of the index indicated by the composite parameter, an index I expressed by (Formula 1) indicated below. Here, y is a parameter indicating the deviation of the moving body, θ is a parameter indicating the angle between the ideal route and the moving direction of the moving direction, and a is a constant. Note that, for the index I, the parameter y as well as a value(s) such as the square of a speed of a right wheel of the moving body and/or the square of a speed of a left wheel of the moving body may be included as part of the composite parameter, for example.

$$I = \int y^2 + \alpha \sin^2\theta \, dt \qquad \text{(Formula 1)}$$

In one example of a method for calculating the index I employed by the present example embodiment, y is developed into the polynomial expressed by (Formula 2) indicated below, and an expansion expression of y is assigned to the index I. Here, i is an index of an integer (i=0, 1, 2, ..., n), and the value of n can be set as appropriate. Further, specific values of the coefficient parameters $a_i$ are determined by the later-described calculation.

As discussed above, in the present example embodiment, the parameter y itself is expressed by the plurality of coefficient parameters $a_i$. Thus, y itself can be expressed as being a composite parameter.

$$y(t) = \Sigma_{i=0}^{n} a_i t^i \qquad \text{(Formula 2)}$$

Meanwhile, given the speed of the moving body is v, sin θ is as indicated by (Formula 4) indicated below.

$$\sin \theta = (dy/dt)/v \qquad \text{(Formula 4)}$$

Therefore, by assigning (Formula 4) to the index I, the path calculating section 122 can calculate the index I including sin θ (note that the symbol "/" indicates a division process (the same applies also to the followings)).

Here, the condition that "if t=T, y=0" is added. In other words, the condition that "if t=T, the moving body returns to the ideal route" is added. That is, for the index I, the path calculating section 122 integrates up to t=T from t=0, and then calculates a path with which the index I takes a minimal value on the basis of $\partial I/\partial a_i = 0$ and $\partial I/\partial T = 0$. Thus, the parameter T indicating the time required for the moving body to return to the ideal route is an upper limit of the integral in (Formula 1).

$a_i$ is n+1 parameters including i=0, 1, 2, ..., n. The index I is differentiated with these parameters to yield the condition that $\partial I/\partial a_i = 0$, based on which n+1 equations can be derived. Thus, by solving n+2 simultaneous equations including the equation $\partial I/\partial T = 0$, the path calculating section 122 can calculate the parameters $a_i$ and T.

As discussed above, by applying the calculated parameters $a_i$ to (Formula 2) above, the path calculating section 122 can obtain y(t) at each time. Further, the path calculating section 122 can calculate, according to (Formula 3) indicated below, a parameter x(t) indicating a position of the moving body in a direction in parallel with the ideal route. Here, v in (Formula 3) indicates the speed of the moving body, similarly to v in (Formula 4).

$$x(t) = \int \sqrt{v^2 - (dy/dt)^2} \, dt \qquad \text{(Formula 3)}$$

In this manner, the path calculating section 122 can calculate routes (x(t), y(t)) at various times until the time T at which the moving body returns to the target route.

In a case where the moving body in accordance with the present example embodiment is an automated guided vehicle (AGV), the path calculating section 122 may make some modification(s) according to the automated guided vehicle. For example, the path calculating section 122 may (a) change the value of α in the index I as appropriate and/or (b) use another parameter in place of the deviation y of the automated guided vehicle in the direction perpendicular to the ideal route.

For example, a weight of a load of the moving body may be obtained, and the value of α may be set so that the value has a positive correlation with the weight thus obtained. By setting the value of α in this manner, a path having a gentler change is generated with a greater weight of the load, provided that a deviation of θ is small. Consequently, it is possible to generate a path that allows stable transportation of a load.

Further, according to the obtained weight of the load and/or other information, it is possible to select whether to use, for the index I, a difference between the square of the speed of the right wheel and the square of the speed of the left wheel, in addition to the parameter y. By adaptively selecting the parameters to be used for the index I in this manner, it is possible to generate a suitable route according to the situation. In this case, the difference between the square of the speed of the right wheel and the square of the speed of the left wheel may be approximated by numerical integration or a rational form, and then a product thereof may be applied to the index I.

As discussed above, the moving-body path calculation device 12 in accordance with the present example embodiment employs the configuration in which the path of the movement of the moving body is calculated so that the index I indicated by the composite parameter including the parameter y indicating the deviation of the moving body takes a minimal value. Consequently, with the moving-body path calculation device 12 in accordance with the present example embodiment, it is possible to attain the effect of suitably calculating a path of movement of the moving body so that the index I including the parameter y indicating the deviation of the moving body takes a minimal value.

Further, the moving-body path calculation device 12 in accordance with the present example embodiment employs the configuration in which the composite parameter includes (a) the parameter T indicating the period of time required for the moving body to return to the ideal route and (b) the parameter y indicating the deviation of the moving body. Thus, with the moving-body path calculation device 12 in accordance with the present example embodiment, it is possible to attain the effect of suitably calculating a path of movement of a moving body, the path including routes (x(t), y(t)) at various times until the time T at which the moving body returns to the target route.

The moving-body path calculation device 12 in accordance with the present example embodiment employs the configuration in which the composite parameter further includes the parameter $\theta$ indicating the angle between the ideal route and the moving direction of the moving body. Thus, with the moving-body path calculation device 12 in accordance with the present example embodiment, it is possible to attain the effect of obtaining the path of the movement of the moving body with use of the index I indicated by the deviation y of the moving body and the angle $\theta$, thereby making it possible to more accurately calculate the path of the movement of the moving body.

Moreover, the moving-body path calculation device 12 in accordance with the present example embodiment employs the configuration in which the path with which the index I takes a minimal value is calculated on the basis of $\partial I/\partial a_i=0$ and $\partial I/\partial T=0$. Thus, with the moving-body path calculation device 12 in accordance with the present example embodiment, it is possible to attain the effect of making it possible to calculate the composite parameter by solving simultaneous equations obtained on the basis of $\partial I/\partial a_i=0$ and $\partial I/\partial T=0$, thereby making it possible to easily obtain the path of the movement of the moving body.

Furthermore, the moving-body path calculation device 12 in accordance with the present example embodiment employs the configuration in which the parameter x indicating the position of the moving body in the direction in parallel with the ideal route is derived on the basis of y at which the index I takes a minimal value. Thus, with the moving-body path calculation device 12 in accordance with the present example embodiment, it is possible to attain the effect of easily calculating the routes (x(t), y(t)) of the moving body at various times.

Third Example Embodiment

The following description will discuss another example embodiment of the present invention with reference to the drawings. Note that members having identical functions to those of the first example embodiment are given identical reference signs, and a description thereof will be omitted.

FIG. 3 is a view schematically illustrating a configuration of a moving body to which the moving-body path calculation device 12 discussed in the first example embodiment is applied. A moving body 1 includes a position detection section 11, a right wheel 16, a left wheel 17, a first driving section 14 that drives the right wheel 16, and a second driving section 15 that drives the left wheel 17. These elements will be discussed in detail later.

The moving body 1 is controlled so that the moving body 1 travels along an ideal route. However, an actual traveling direction of the moving body 1 deviates from a direction of the ideal route. An angle between the traveling direction of the moving body 1 and the direction of the ideal route is designated as $\theta$. In other words, as shown in FIG. 3, an angle between a speed vector v of the moving body 1 and a direction vector of the ideal route is designated as $\theta$. Further, as shown in FIG. 3, a distance between the right wheel 16 and the left wheel 17 of the moving body 1 is designated as D.

Figure 4:
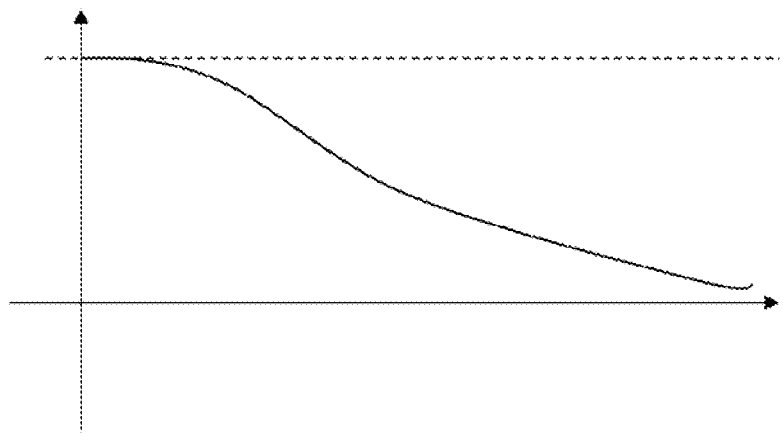
FIG. 4 is a view illustrating an example of a traveling control of a moving body.
Figure 5:
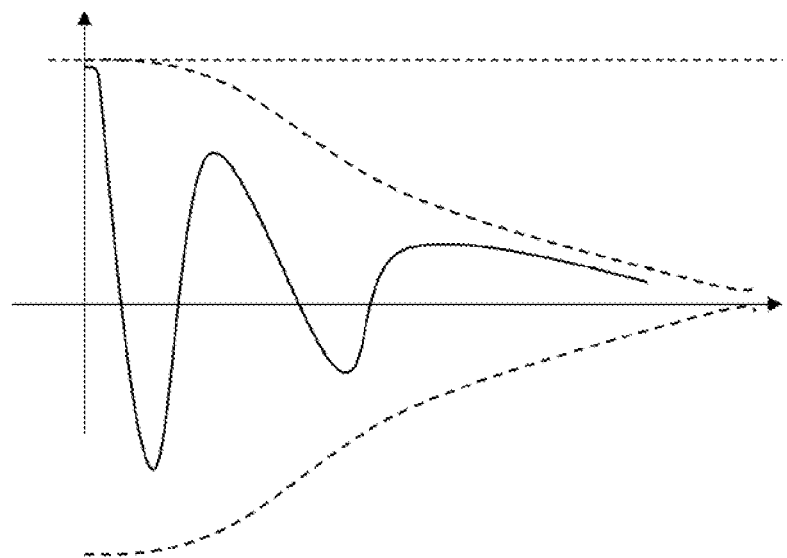
FIG. 5 is a view illustrating another example of a traveling control of a moving body.

Each of FIGS. 4 and 5 is a view illustrating an example of traveling control of a moving body. FIG. 4 shows an example of a moving path in accordance with a comparative example, whereas FIG. 5 shows an example of a path calculated by the moving-body path calculation device 12 of the moving body 1. In FIG. 4, the path of the movement of the moving body observed until the moving body returns to the ideal route changes gently. Meanwhile, with the moving-body path calculation device 12 in accordance with the present example embodiment, the direction of the moving body 1 observed until the moving body 1 returns to the ideal route drastically changes as shown in FIG. 5, as compared to the example shown in FIG. 4. This is because the moving-body path calculation device 12 in accordance with the present example embodiment uses, as an index given by a composite parameter, the index I indicated in (Formula 1) discussed above. Consequently, the time required for the moving body 1 to return to the ideal route is reduced.

From the viewpoint of an amount of deviation from the ideal route, the path shown in FIG. 4, which changes gently, has a large total amount of the deviation from the ideal route. Meanwhile, the path of the moving body 1 shown in FIG. 5, which changes drastically, has a small total amount of deviation from the ideal route. The present example embodiment uses, as the index given by the composite parameter, the index I indicated by (Formula 1) discussed above, thereby making it possible to reduce the amount of deviation from the ideal route.

Since FIG. 5 shows the path of the movement of the moving body 1 observed when 0 or a minimal value is set as $\alpha$ in Formula 1, the path of the movement of the moving body 1 changes drastically. However, by setting $\alpha$ appropriately, it is possible to make the change in the path smooth.

The value of $\alpha$ may be set by an administrator in advance. Alternatively, the value of $\alpha$ may be adaptively set by the moving-body path calculation device 12 according to the weight of the load carried by the moving body 1 and/or the like, as discussed in the second example embodiment.

(Configuration of Moving Body 1)

Figure 6:
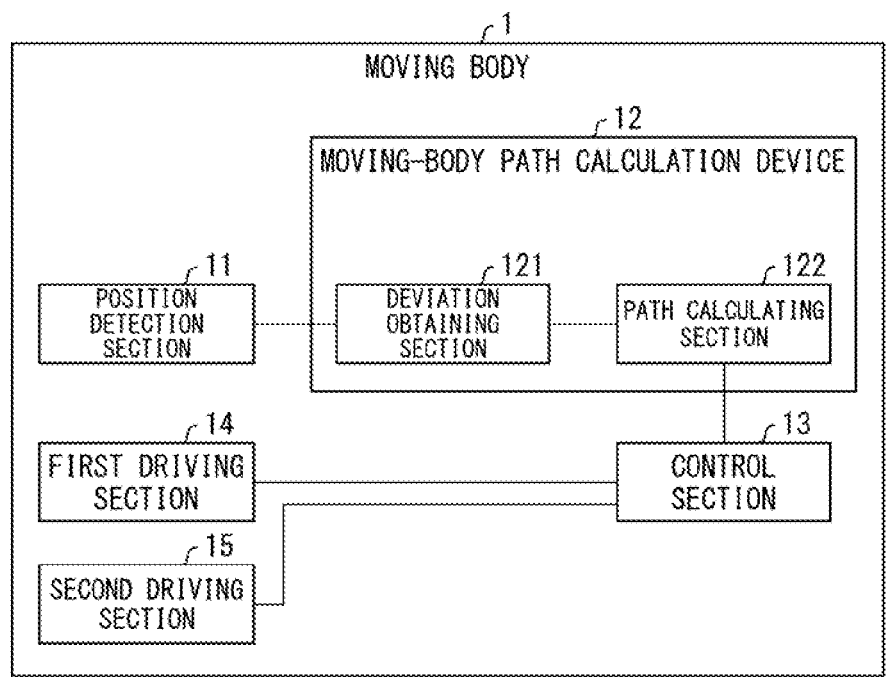
FIG. 6 is a block diagram illustrating a functional configuration of a moving body in accordance with a third example embodiment of the present invention.

FIG. 6 is a block diagram illustrating a functional configuration of the moving body 1 in accordance with the present example embodiment. The moving body 1 includes the position detection section 11, the moving-body path calculation device 12, a control section 13, the first driving section 14, and the second driving section 15. In another configuration of the moving body 1, the control section 13 may include the moving-body path calculation device 12.

The position detection section 11 is configured to detect position information of the moving body 1. For example, a distance measuring sensor is used to measure a distance to a wall, and the position information of the moving body 1 is detected on the basis of the distance to the wall. In this case, the direction of the ideal route is set on the basis of a route having a constant distance to the wall.

The position detection section 11 may include an image-capturing device. The image-capturing device captures an image in front of the moving body 1, and analyzes the image so as to detect the position of the moving body 1.

Further, the position detection section 11 may detect the position of the moving body 1 with use of satellite information obtained by global positioning system (GPS), quasi-zenith satellite system (QZSS), and/or the like.

Further, as described later, the image-capturing device externally provided to the moving body 1 captures an image of the moving body 1 and analyzes the image thus captured, thereby detecting the position of the moving body 1.

The deviation obtaining section 121 refers to the position information of the moving body 1 detected by the position detection section 11, and obtains a parameter y related to a deviation of the moving body 1 in a direction perpendicular to the ideal route. Then, the deviation obtaining section 121 outputs the parameter y to the path calculating section 122.

On the basis of a composite parameter including the parameter y indicating the deviation of the moving body which deviation has been obtained by the deviation obtaining section 121, the path calculating section 122 calculates a path of movement of the moving body 1 and outputs the path to the control section 13. A method for calculating the path of the movement of the moving body 1 is identical to those discussed in the first and second example embodiments.

On the basis of the path of the moving body 1 received from the path calculating section 122, the control section 13 obtains paths of the moving body 1 at various times. Then, on the basis of the paths, the path calculating section 122 calculates a speed Vr of the right wheel 16 and a speed Vl of the left wheel 17. The control section 13 can obtain Vr and Vl according to the simultaneous equations indicated as Formulae 5 and 6 below. Here, assume that the speed V is constant.

$$V=(Vr+Vl)/2 \quad \text{(Formula 5)}$$

$$d(\arctan((dy/dt)/(dx/dt)))/dt=(Vr-Vl)/2D \quad \text{(Formula 6)}$$

Each of the first driving section 14 and the second driving section 15 includes a servomotor and an inverter circuit that controls the servomotor. The first driving section 14 and the second driving section 15 drive the right wheel 16 and the left wheel 17, respectively. The control section 13 gives, as an instruction, the calculated speed Vr of the right wheel 16 to the inverter circuit of the first driving section 14, and gives, as an instruction, the calculated speed Vl of the left wheel 17. The inverter circuit of the first driving section 14 controls the servomotor so that the right wheel 16 has a speed of Vr. Similarly, the inverter circuit of the second driving section 15 controls the servomotor so that the left wheel 17 has a speed of Vl.

In a case where the moving body 1 in accordance with the present example embodiment is an automated guided vehicle, the path calculating section 122 may make some modification(s) according to the automated guided vehicle. For example, the path calculating section 122 may (a) change the value of α in the index I as appropriate and/or (b) use another parameter in place of the deviation y of the automated guided vehicle in the direction perpendicular to the ideal route.

For example, a weight of a load of the moving body may be obtained, and the value of α may be set so that the value has a positive correlation with the weight thus obtained. By setting the value of aα in this manner, a path having a gentler change is generated with a greater weight of the load. Consequently, it is possible to generate a path that allows stable transportation of a load.

Figure 7:
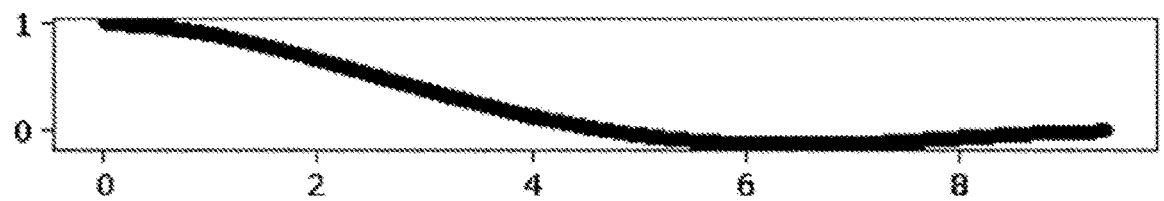
FIG. 7 is a view illustrating an example of a path of movement of the moving body in accordance with the third example embodiment of the present invention.
Figure 8:
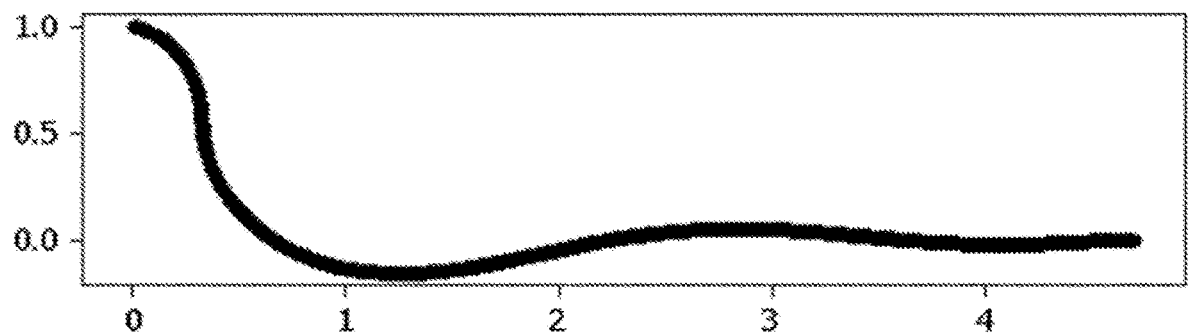
FIG. 8 is a view illustrating another example of a path of movement of the moving body in accordance with the third example embodiment of the present invention.

Each of FIGS. 7 and 8 is a view illustrating a path of movement of the moving body 1 in accordance with the present example embodiment. In each of FIGS. 7 and 8, a horizontal axis indicates a time t (second), and a vertical axis indicates a deviation y (m: meter). The value of α in Formula 1 in FIG. 7 is different from that of FIG. 8, and the value of α in FIG. 7 is larger than that of α in FIG. 8. In either of FIGS. 7 and 8, the deviation y of the moving body 1 is converged to 0. Thus, by changing the value of α, it is possible to change the period of time taken for the moving body 1 to match the ideal route for the first time.

Figure 9:
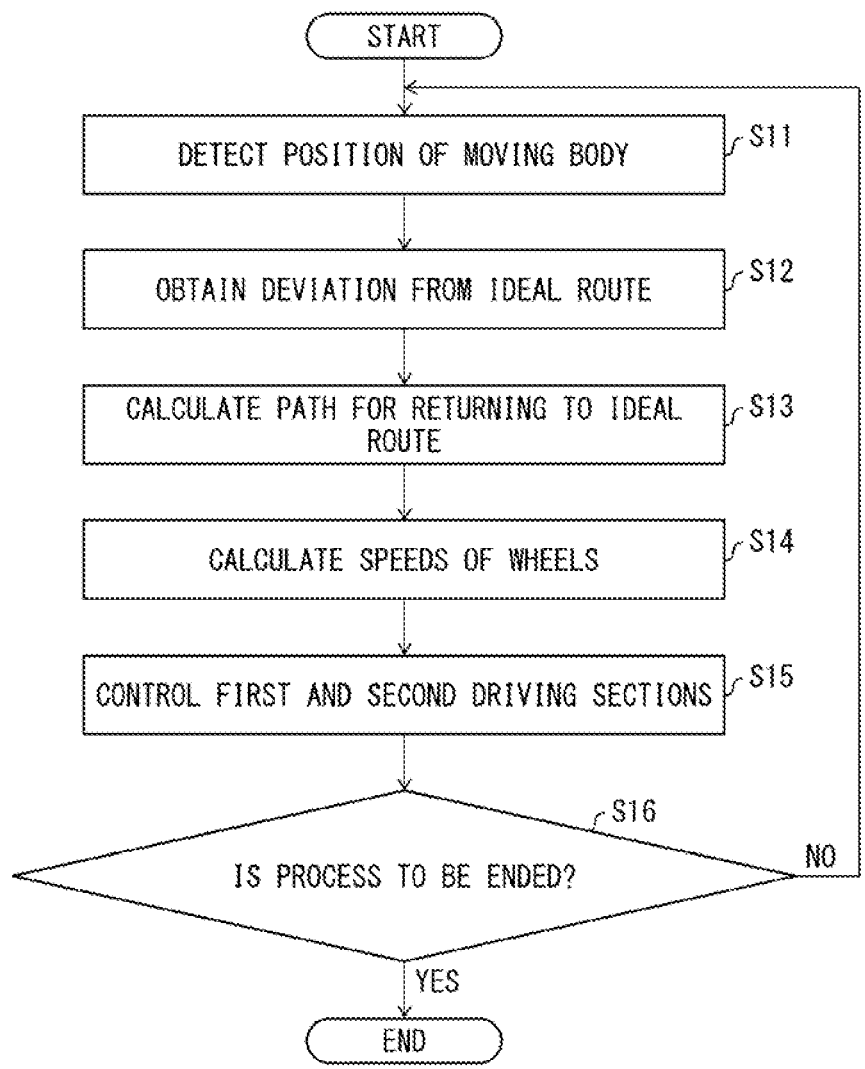
FIG. 9 is a flowchart illustrating a process procedure of the moving body in accordance with the third example embodiment of the present invention.

FIG. 9 is a flowchart illustrating a process procedure of the moving body 1 in accordance with the third example embodiment. First, the position detection section 11 detects the position of the moving body 1, and outputs the position information to the deviation obtaining section 121 (S11).

The deviation obtaining section 121 refers to the position information of the moving body 1 output by the position detection section 11, and obtains a parameter y related to the deviation of the moving body 1 in the direction perpendicular to the ideal route. Then, the deviation obtaining section 121 outputs the parameter y to the path calculating section 122 (S12).

On the basis of the composite parameter including the parameter y indicating the deviation of the moving body output from the deviation obtaining section 121, the path calculating section 122 calculates a path of movement of the moving body 1 for returning to the ideal route, and outputs the path to the control section 13 (S13).

On the basis of the path of the moving body 1 received from the path calculating section 122, the control section 13 calculates the speed Vr of the right wheel 16 and the speed Vl of the left wheel 17 (S14), and controls the first driving section 14 and the second driving section 15 so that the speeds of the first driving section 14 and the second driving section 15 become Vr and Vl, respectively (S15).

Lastly, it is determined whether or not the process is to be ended (S16). If the process is to be ended, for example, if traveling of the moving body 1 is to be ended (S16, Yes), the process is ended as it is. If the process is not to be ended (S16, No), the process goes back to step S11 and the subsequent processes are carried out again.

As discussed above, the moving body 1 in accordance with the present example embodiment employs the configuration in which the control section 13 calculates, on the basis of the path of the moving body 1 received from the path calculating section 122, the speed Vr of the right wheel 16 and the speed Vl of the left wheel 17 and controls the first driving section 14 and the second driving section 15. Therefore, with the moving body 1 in accordance with the present example embodiment, it is possible to attain, in addition to the effects given by the moving-body path calculation devices 12 in accordance with the first and second example embodiments, the effect of making it possible for the moving body 1 to move along the calculated path.

Fourth Example Embodiment

The following description will discuss another example embodiment of the present invention with reference to the drawings. Note that members having identical functions to those of the first to third example embodiments are given identical reference signs, and a description thereof will be omitted.

(Configuration of Remote Control Device 2)

Figure 10:
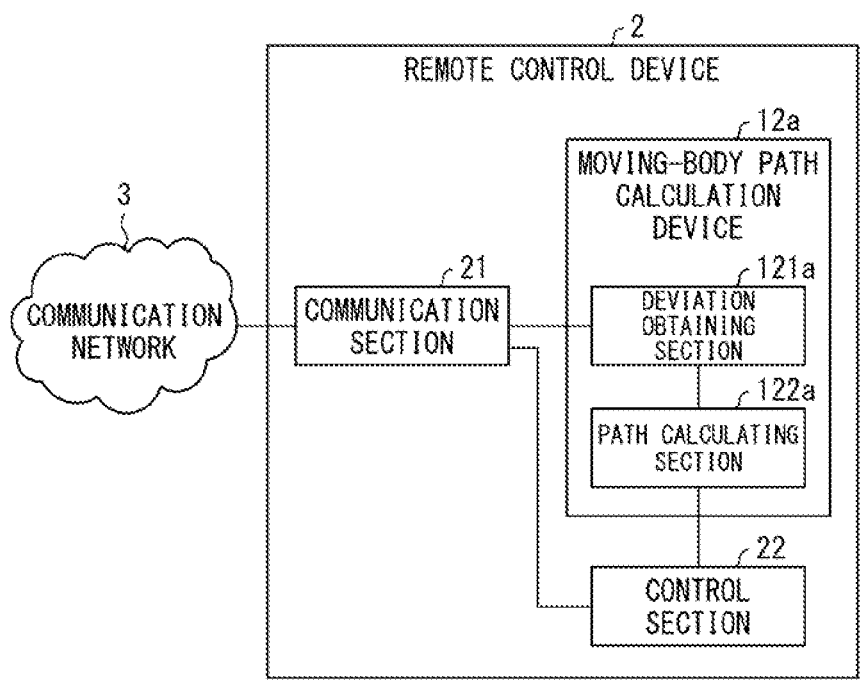
FIG. 10 is a block diagram illustrating a functional configuration of a remote control device in accordance with a fourth example embodiment of the present invention.

FIG. 10 is a block diagram illustrating a functional configuration of a remote control device 2 in accordance with the present example embodiment. The remote control device 2 includes a communication section 21 connected to a communication network 3, a moving-body path calculation device 12*a*, and a control section 22. In another configuration of the remote control device 2, the control section 22 may include the moving-body path calculation device 12*a*.

The communication section 21 is connected to the communication network 3 such as a local area network (LAN). The communication section 21 communicates with a moving body and an image-capturing device via the communication network 3. Specifically, the communication section 21 receives, from the image-capturing device, an image of a space including the moving body, and transmits, to the moving body, a path of movement of the moving body.

The deviation obtaining section 121*a* analyzes the image of the space including the moving body which image is output from the communication section 21, and detects the position of the moving body. Then, the deviation obtaining section 121*a* obtains a parameter y regarding a deviation of the moving body in a direction perpendicular to an ideal route, and outputs the parameter y to the path calculating section 122*a*. Note that a method for detecting the position of the moving body 1*a* on the basis of the analysis result of the image of the space including the moving body 1*a* is widely known and therefore detailed description thereof is omitted here.

On the basis of a composite parameter including the parameter y indicating the deviation of the moving body which deviation has been obtained by the deviation obtaining section 121*a*, the path calculating section 122*a* calculates a path of movement of the moving body 1*a* and outputs the path to the control section 22. A method for calculating the path of the movement of the moving body 1*a* is identical to those discussed in the first and second example embodiments.

The control section 22 transmits, to the moving body 1*a* via the communication section 21, the path of the movement of the moving body 1*a* received from the path calculating section 122*a*.

In a case where the moving body 1*a* in accordance with the present example embodiment is an automated guided vehicle, the path calculating section 122*a* may make some modification(s) according to the automated guided vehicle. For example, the path calculating section 122 may (a) change the value of α in the index I as appropriate and/or (b) use another parameter in place of the deviation y of the automated guided vehicle in the direction perpendicular to the ideal route.

For example, a weight of a load of the moving body may be obtained, and the value of α may be set so that the value has a positive correlation with the weight thus obtained. By setting the value of α in this manner, a path having a gentler change is generated with a greater weight of the load. Consequently, it is possible to generate a path that allows stable transportation of a load.

Figure 11:
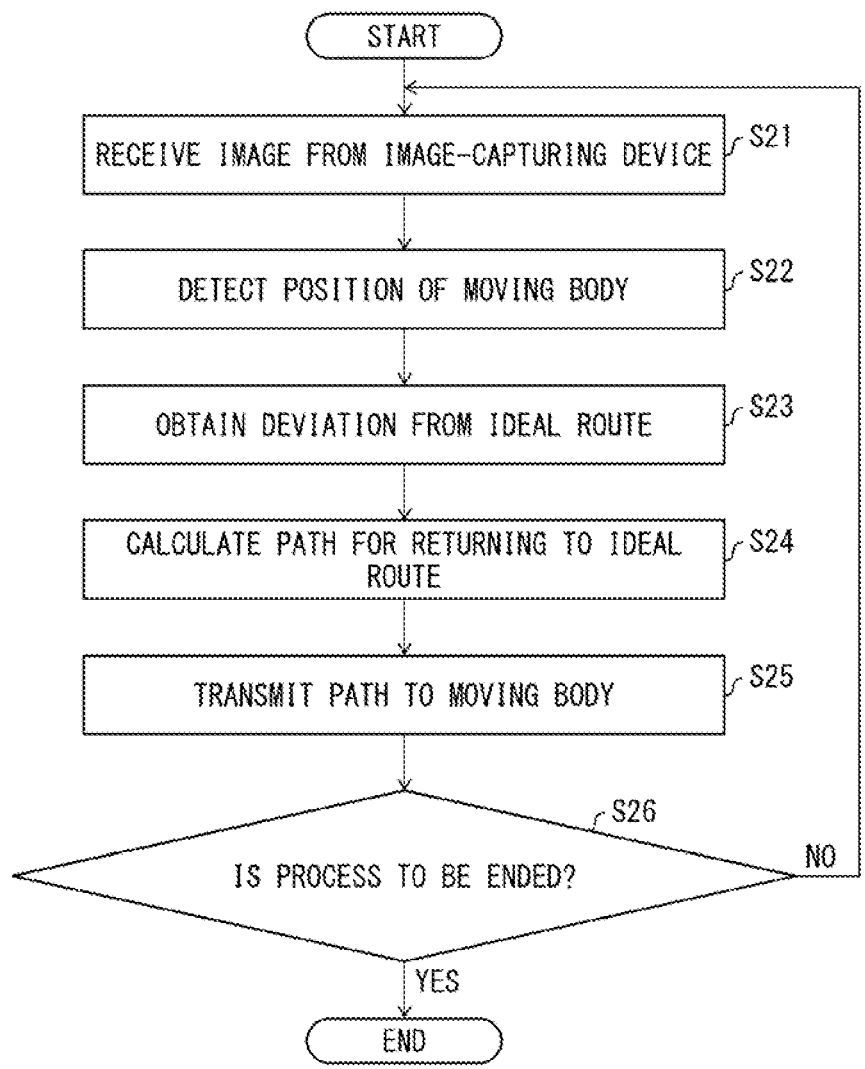
FIG. 11 is a flowchart illustrating a process procedure of the remote control device in accordance with the fourth example embodiment of the present invention.

FIG. 11 is a flowchart illustrating a process procedure of the remote control device 2 in accordance with the fourth example embodiment. First, the communication section 21 receives, from the image-capturing device 4, an image of a space including the moving body 1*a*, and outputs the image to the deviation obtaining section 121*a* (S21).

The deviation obtaining section 121*a* refers to the image of the space including the moving body 1*a* which image is output by the communication section 21, and detects the position of the moving body 1*a* (S22). Then, the deviation obtaining section 121*a* obtains the parameter y related to the deviation of the moving body 1*a* in the direction perpendicular to the ideal route, and outputs the parameter y to the path calculating section 122*a* (S23).

On the basis of the composite parameter including the parameter y indicating the deviation of the moving body output from the deviation obtaining section 121*a*, the path calculating section 122*a* calculates a path of movement of the moving body 1*a* for returning to the ideal route and outputs the path to the control section 22 (S24).

The control section 22 transmits, to the moving body 1*a* via the communication section 21, the path of the movement of the moving body 1*a* received from the path calculating section 122*a* (S25).

Lastly, it is determined whether or not the process is to be ended (S26). If the process is to be ended, for example, if traveling of the moving body 1*a* is to be ended (S26, Yes), the process is ended as it is. If the process is not to be ended (S26, No), the process goes back to step S21 and the subsequent processes are carried out again.

As discussed above, the remote control device 2 in accordance with the present example embodiment employs the configuration in which the control section 22 transmits, to the moving body 1*a* via the communication section 21, a path of movement of the moving body 1*a* received from the path calculating section 122*a*. Thus, with the remote control device 2 in accordance with the present example embodiment, it is possible to attain, in addition to the effects given by the moving-body path calculation devices 12 in accordance with the first and second example embodiments, the effect of eliminating the need for the moving body 1*a* to calculate a path of movement of the moving body 1*a*, thereby reducing the processing load of the moving body 1*a*.

Fifth Example Embodiment

The following description will discuss another example embodiment of the present invention with reference to the drawings. Note that members having identical functions to those of the first to fourth example embodiments are given identical reference signs, and a description thereof will be omitted.

(Configuration of Moving Body System 100)

Figure 12:
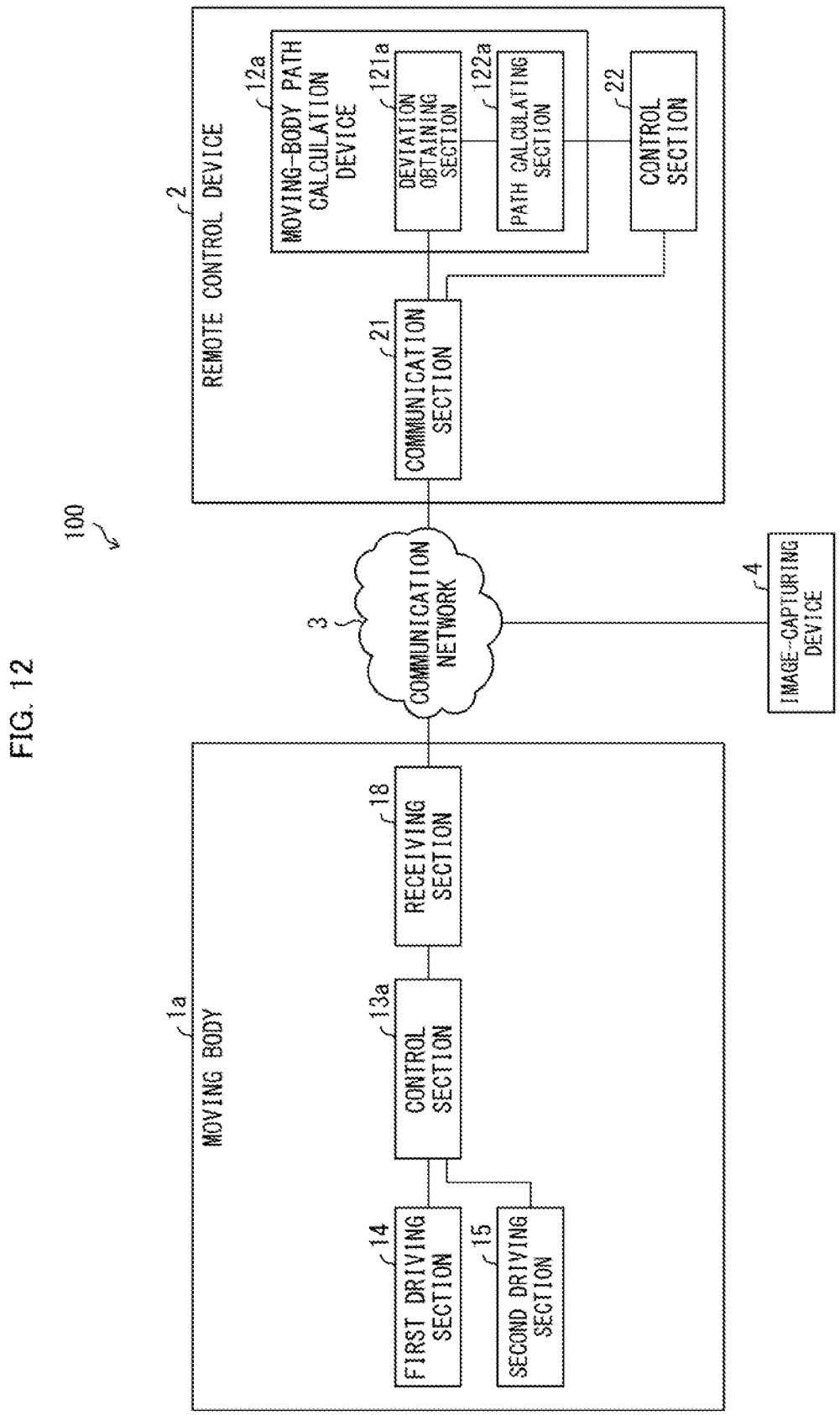
FIG. 12 is a block diagram illustrating a functional configuration of a moving body system in accordance with a fifth example embodiment of the present invention.

FIG. 12 is a block diagram illustrating a functional configuration of a moving body system 100 in accordance with the present example embodiment. The moving body system 100 includes a moving body 1*a*, a remote control device 2, and an image-capturing device 4 connected to a communication network 3. A configuration and a process procedure of the remote control device 2 are identical to those discussed in the fourth example embodiment.

The moving body 1*a* includes a control section 13*a*, a first driving section 14, a second driving section 15, and a receiving section 18. The receiving section 18 is connected to the communication network 3 such as LAN, and is configured to receive, from the remote control device 2, a path of movement of the moving body 1a and output the path to the control section 13a.

On the basis of the path of the moving body 1a received from the receiving section 18, the control section 13a obtains routes of the moving body 1a at various times. Then, on the basis of the routes, the control section 13a calculates a speed Vr of a right wheel 16 and a speed Vl of a left wheel 17. Then, the control section 13a controls the first driving section 14 so that the speed of the right wheel 16 becomes Vr and controls the second driving section 15 so that the speed of the left wheel 17 becomes Vl.

Figure 13:
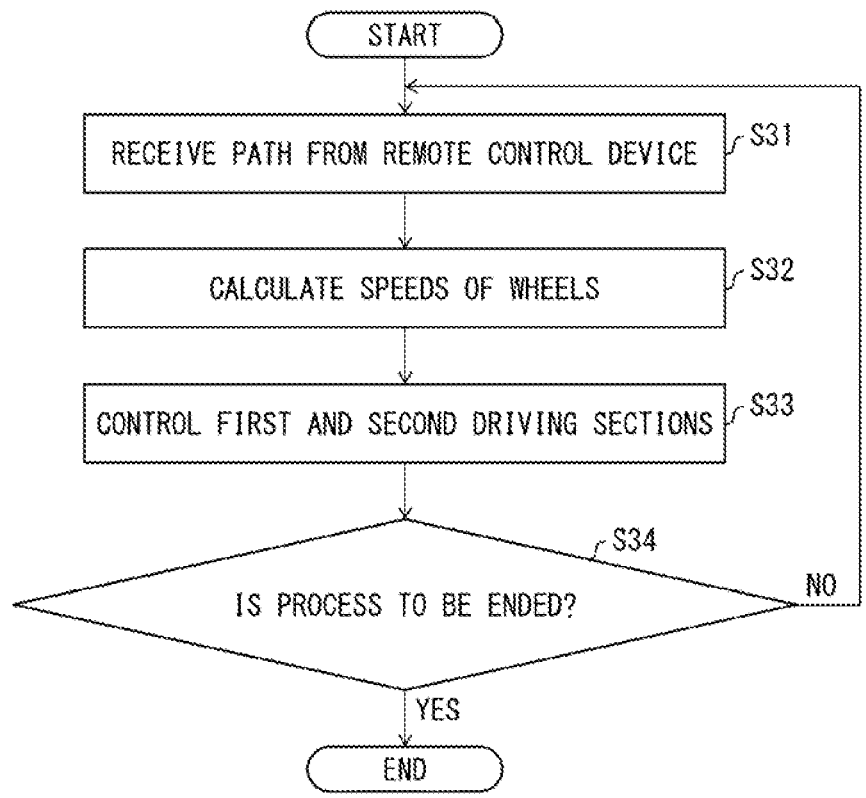
FIG. 13 is a flowchart illustrating a process procedure of a moving body in accordance with the fifth example embodiment of the present invention.

FIG. 13 is a flowchart illustrating a process procedure of the moving body 1a. First, the receiving section 18 receives, from the remote control device 2, the path of the movement of the moving body 1a, and outputs the path to the control section 13a (S31).

The control section 13a calculates, on the basis of the path of the moving body 1a received from the receiving section 18, the speed Vr of the right wheel 16 and the speed Vl of the left wheel 17 (S32), and controls the first driving section 14 so that the right wheel 16 has a speed of Vr and controls the second driving section 15 so that the left wheel 17 has a speed of Vl (S33).

Lastly, it is determined whether or not the process is to be ended (S34). If the process is to be ended, for example, if traveling of the moving body 1a is to be ended (S34, Yes), the process is ended as it is. If the process is not to be ended (S34, No), the process goes back to step S31 and the subsequent processes are carried out again.

As discussed above, the moving body system 100 in accordance with the present example embodiment employs the configuration in which the control section 13a calculates, on the basis of the path of the movement of the moving body 1a received from the remote control device 2, the speed Vr of the right wheel 16 and the speed Vl of the left wheel 17. Thus, with the moving body system 100 in accordance with the present example embodiment, it is possible to attain, in addition to the effects given by the moving-body path calculation devices 12 in accordance with the first and second example embodiments, the effect of eliminating the need for the moving body 1a to calculate a path of movement of the moving body 1a, thereby reducing the processing load of the moving body 1a.

In each of the cases of the third and fifth example embodiments, the moving body is a two-wheel vehicle. However, in a case where the moving body is a four-wheel vehicle, it is also possible to calculate a path of movement of the moving body and control traveling of the moving body on the basis of the path in a similar manner. For example, even in a case where the moving body is a four-wheel vehicle, employing the path racking control using the model predictive control (MPC) makes it possible to control the moving body so that the moving body travels along the calculated path. Further, feedback control such as proportional-integral-differential controller (PID) can be used to control traveling of the moving body. With this, even in a case where the moving body is a four-wheel vehicle, it is possible to control the moving body so that the moving body travels along the calculated path.

Software Implementation Example

Control blocks of the moving bodies 1 and 1a, the remote control device 2, the moving-body path calculation devices 12 and 12a (particularly, the control sections 13, 13a, and 22, the deviation obtaining sections 121 and 121a, and the path calculating sections 122 and 122a) can be realized by a logic circuit (hardware) provided in an integrated circuit (IC chip) or the like or can be alternatively realized by software.

In the latter case, each of the moving bodies 1 and 1a, the remote control device 2, and the moving-body path calculation devices 12 and 12a includes a computer that executes instructions of a program that is software realizing the foregoing functions. The computer, for example, includes at least one processor (control device) and at least one computer-readable storage medium storing the program.

Figure 14:
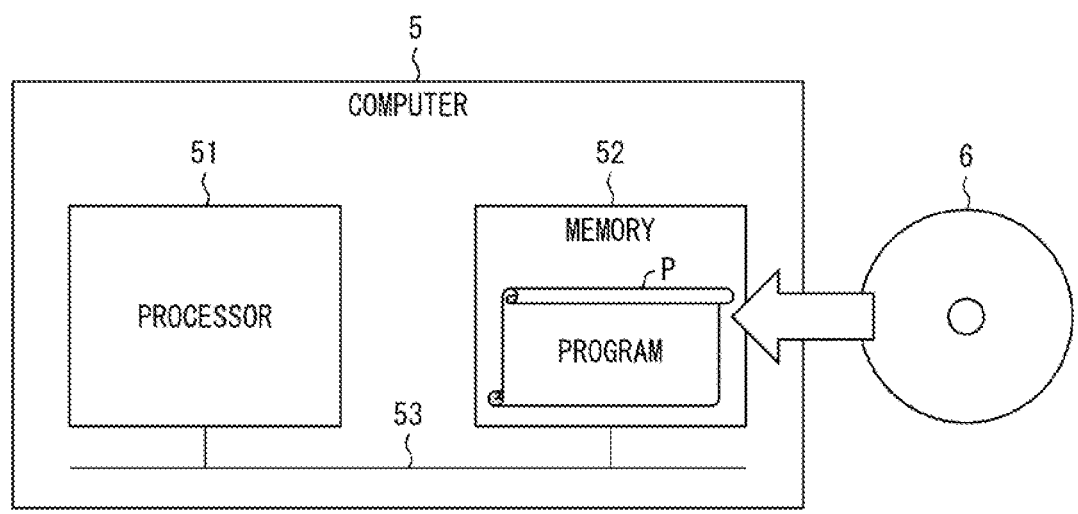
FIG. 14 is a view illustrating an example of a hardware configuration of a computer.

FIG. 14 is a view illustrating an example of a hardware configuration of the computer. A computer 5 includes a processor 51 and a memory 52 storing a program P stored in a storage medium 6, the processor 51 and the memory 52 being connected with each other via an internal bus 53.

An example object of the present invention can be achieved by the processor 51 of the computer 5 reading and executing the program P stored in the storage medium 6. Examples of the processor 51 encompass a central processing unit (CPU). Examples of the storage medium 6 encompass a "non-transitory tangible medium" such as a compact disc-read only memory (CD-ROM), a digital versatile disc (DVD), a read only memory (ROM), a tape, a disk, a card, a semiconductor memory, and a programmable logic circuit. The computer may further include a random access memory (RAM) or the like as the memory 52 in which the program P is loaded. Further, the program P may be made available to the computer 5 via any transmission medium (such as a communication network and a broadcast wave) which allows the program P to be transmitted. Note that an example aspect of the present invention can also be achieved in the form of a computer data signal in which the program P is embodied via electronic transmission and which is embedded in a carrier wave.

[Supplementary Note 1]

The present invention is not limited to the example embodiments, but can be altered by a skilled person in the art within the scope of the claims. The present invention also encompasses, in its technical scope, any embodiment derived by combining technical means disclosed in differing embodiments.

[Supplementary Note 2]

Some or all of the above example embodiments can be described as below. Note however that the present invention is not limited to aspects described below.

A moving-body path calculation device in accordance with a first example aspect includes: a deviation obtaining means that obtains a deviation of a moving body in a direction perpendicular to an ideal route; and a path calculating means that calculates a path of movement of the moving body on a basis of a composite parameter including a parameter indicating the deviation of the moving body which deviation has been obtained by the deviation obtaining means.

With the above configuration, it is possible to calculate the path of the movement of the moving body, the path including routes of the moving body obtained at various times.

A moving-body path calculation device in accordance with a second example aspect employs, in addition to the configuration of the first example aspect, a configuration in which the path calculating means calculates the path of the movement of the moving body so that an index indicated by the composite parameter takes a minimal value.

With the above configuration, it is possible to calculate a path of movement of the moving body such that the index indicated by the composite parameter takes a minimal value.

A moving-body path calculation device in accordance with a third example aspect employs, in addition to the configuration of the first or second example aspect, a configuration in which the composite parameter includes a parameter indicating a period of time required for the moving body to return to the ideal route and a parameter indicating the deviation of the moving body which deviation has been obtained by the deviation obtaining means.

With the above configuration, it is possible to calculate the path of the movement of the moving body, the path including routes of the moving body at various times until a time at which the moving body returns to a target route.

A moving-body path calculation device in accordance with a fourth example aspect employs, in addition to the configuration of the third example aspect, a configuration in which the composite parameter further includes a parameter indicating an angle between the ideal route and a moving direction of the moving body.

With the above configuration, it is possible to obtain the path of the movement of the moving body with use of the index indicated by the deviation of the moving body and the angle between the ideal route and the moving direction of the moving body, thereby making it possible to more accurately calculate the path of the movement of the moving body.

A moving-body path calculation device in accordance with a fifth example aspect employs, in addition to the configuration of the fourth example aspect, a configuration in which the path calculating means uses the following formulae 1 and 2 to calculate, on a basis of $\partial I/\partial a_i = 0$ and $\partial I/\partial T = 0$, a path with which I takes a minimal value, where T is the parameter indicating the period of time required for the moving body to return to the ideal route, y is the parameter indicating the deviation of the moving body which deviation has been obtained by the deviation obtaining means, and $\theta$ is the parameter indicating the angle between the ideal route and the moving direction of the moving body:

$$I = \int y^2 + \alpha \sin^2\theta \, dt \quad \text{(Formula 1)}$$

$$y(t) = \Sigma_{i=0}^{n} a_i t^i \quad \text{(Formula 2)}$$

With the above configuration, it is possible to calculate the composite parameter by solving simultaneous equations obtained on the basis of $\partial I/\partial a_i = 0$ and $\partial I/\partial T = 0$, thereby making it possible to easily obtain the path of the movement of the moving body.

A moving-body path calculation device in accordance with a sixth example aspect employs, in addition to the configuration of the fifth example aspect, a configuration in which the path calculating means uses the following formula 6 to derive, on a basis of y at which I takes a minimal value, a parameter x indicating a position of the moving body in a direction in parallel with the ideal route.

With the above configuration, it is possible to easily calculate the routes (x(t), y(t)) of the moving body at various times.

A moving body in accordance with a seventh example aspect includes: a driving means that drives a plurality of wheels; a position detecting means that detects position information of the moving body; a deviation obtaining means that refers to the position information of the moving body detected by the position detecting means and obtains a deviation of the moving body in a direction perpendicular to an ideal route; a path calculating means that calculates a path of movement of the moving body on a basis of a composite parameter including a parameter indicating the deviation of the moving body which deviation has been obtained by the deviation obtaining means; and a control means that obtains routes of the moving body at various times on a basis of the path calculated by the path calculating means, calculating speeds of the plurality of wheels on the basis of the routes, and controls the driving means.

With the above configuration, the moving body can travel along the calculated path.

A remote control device in accordance with an eighth example aspect includes: a communication means that receives an image of a moving body having been captured and transmits a path of movement of the moving body to the moving body; a deviation obtaining means that refers to the image of the moving body received by the communication means and obtains a deviation of the moving body in a direction perpendicular to an ideal route; and a path calculating means that (a) calculates a path of movement of the moving body on a basis of a composite parameter including a parameter indicating the deviation of the moving body which deviation has been obtained by the deviation obtaining means and (b) causes the communication means to transmit the path.

The above configuration eliminates the need to calculate, in the moving body, the path of the movement of the moving body, thereby making it possible to reduce the processing load of the moving body.

A moving body system in accordance with a ninth example aspect includes: a moving body; a remote control device; and an image-capturing device configured to capture an image of the moving body, the remote control device including a communication means that receives the image of the moving body captured by the image-capturing device and transmits a path of movement of the moving body to the moving body, a deviation obtaining means that refers to the image of the moving body received by the communication means and obtains a deviation of the moving body in a direction perpendicular to an ideal route, and a path calculating means that (a) calculates a path of movement of the moving body on a basis of a composite parameter including a parameter indicating the deviation of the moving body which deviation has been obtained by the deviation obtaining means and (b) causes the communication means to transmit the path, and the moving body including a driving means that drives a plurality of wheels, a receiving means that receives, from the remote control device, the path of the movement of the moving body, and a control means that obtains, on a basis of the path of the movement of the moving body received by the receiving means, routes of the moving body at various times, calculates speeds of the plurality of wheels on the basis of the routes, and controls the driving means.

The above configuration eliminates the need to calculate, in the moving body, the path of the movement of the moving body, thereby making it possible to reduce the processing load of the moving body.

A method in accordance with a tenth example aspect for calculating a path of movement of a moving body, the method including: obtaining, by a moving-body path calculation device, a deviation of the moving body in a direction perpendicular to an ideal route; and calculating, by the moving-body path calculation device, a path of movement of the moving body on a basis of a composite parameter including a parameter indicating the deviation of the moving body having been obtained.

With the above configuration, it is possible to calculate a path of movement of the moving body, the path including routes of the moving body obtained at various times.

A storage medium in accordance with an eleventh example aspect in which a moving-body path calculating program is stored is a computer-readable storage medium, the moving-body path calculating program causing a computer (a) to obtain a deviation of a moving body in a direction perpendicular to an ideal route and (b) to calculate a path of movement of the moving body on a basis of a composite parameter including a parameter indicating the deviation of the moving body having been obtained.

With the above configuration, it is possible to calculate a path of movement of the moving body, the path including routes of the moving body obtained at various times.

REFERENCE SIGNS LIST 1, 1a: moving body
2: remote control device
3: communication network
4: image-capturing device
5: computer
6: storage medium
11: position detection section
12: moving-body path calculation device
13, 13a, 22: control section
14: first driving section
15: second driving section
16: right wheel
17: left wheel
18: receiving section
21: communication section
51: processor
52: memory
53: internal bus
100: moving body system
121, 121a: deviation obtaining section
122, 122a: path calculating section
P: program

The invention claimed is:

1. A moving-body path calculation device comprising at least one processor,
the at least one processor being configured to execute:
　a process of obtaining a deviation of a moving body in a direction perpendicular to an ideal route; and
　a process of calculating a path of movement of the moving body on a basis of a composite parameter including a parameter indicating the deviation of the moving body having been obtained, wherein
the composite parameter includes
　a parameter indicating a period of time required for the moving body to return to the ideal route,
　a parameter indicating the deviation of the moving body having been obtained, and
　a parameter indicating an angle between the ideal route and a moving direction of the moving body,
in the process of calculating the path of the movement of the moving body, the at least one processor calculates, on a basis of $\partial I/\partial a_i=0$ and $\partial I/\partial T=0$, a path with which I takes a minimal value by substituting y of Formula 1 below with a polynomial of Formula 2 below, where T is the parameter indicating the period of time required for the moving body to return to the ideal route, y is the parameter indicating the deviation of the moving body having been obtained, θ is the parameter indicating the angle between the ideal route and the moving direction of the moving body, $a_i$ is a coefficient parameter, n is a positive integer, and α is a constant:

$$I = \int y^2 + \alpha \sin^2\theta \, dt \quad \text{(Formula 1)}$$

$$y(t) = \Sigma_{i=0}^{n} a_i t^i \quad \text{(Formula 2).}$$

2. The moving-body path calculation device according to claim 1, wherein:
in the process of calculating the path of the movement of the moving body, the at least one processor uses the following formula 3 to derive, on a basis of y at which I takes a minimal value, a parameter x indicating a position of the moving body in a direction in parallel with the ideal route:

$$x(t) = \int \sqrt{v^2 - (dy/dt)^2} \, dt \quad \text{(Formula 3).}$$

3. A moving body comprising at least one processor,
the at least one processor being configured to execute:
　a process of obtaining a deviation of a moving body in a direction perpendicular to an ideal route; and
　a process of calculating a path of movement of the moving body on a basis of a composite parameter including a parameter indicating the deviation of the moving body having been obtained, wherein
the composite parameter includes
　a parameter indicating a period of time required for the moving body to return to the ideal route,
　a parameter indicating the deviation of the moving body having been obtained, and
　a parameter indicating an angle between the ideal route and a moving direction of the moving body,
in the process of calculating the path of the movement of the moving body, the at least one processor calculates, on a basis of $\partial I/\partial a_i=0$ and $\partial I/\partial T=0$, a path with which I takes a minimal value by substituting y of Formula 1 below with a polynomial of Formula 2 below, where T is the parameter indicating the period of time required for the moving body to return to the ideal route, y is the parameter indicating the deviation of the moving body having been obtained, θ is the parameter indicating the angle between the ideal route and the moving direction of the moving body, $a_i$ is a coefficient parameter, n is a positive integer, and α is a constant:

$$I = \int y^2 + \alpha \sin^2\theta \, dt \quad \text{(Formula 1)}$$

$$y(t) = \Sigma_{i=0}^{n} a_i t^i \quad \text{(Formula 2).}$$

4. The moving body according to claim 3, wherein:
in the process of calculating the path of the movement of the moving body, the at least one processor uses the following formula 3 to derive, on a basis of y at which I takes a minimal value, a parameter x indicating a position of the moving body in a direction in parallel with the ideal route $$x(t) = \int \sqrt{v^2 - (dy/dt)^2} \, dt \quad \text{(Formula 3).}$$

5. A method comprising:
obtaining a deviation of a moving body in a direction perpendicular to an ideal route; and
calculating a path of movement of the moving body on a basis of a composite parameter including a parameter indicating the deviation of the moving body having been obtained, wherein
the composite parameter includes
　a parameter indicating a period of time required for the moving body to return to the ideal route, a parameter indicating the deviation of the moving body having been obtained, and a parameter indicating an angle between the ideal route and a moving direction of the moving body, in calculating the path of the movement of the moving body, the method calculates, on a basis of $\partial I/\partial a_i=0$ and $\partial I/\partial T=0$, a path with which I takes a minimal value by substituting y of Formula 1 below with a polynomial of Formula 2 below, where T is the parameter indicating the period of time required for the moving body to return to the ideal route, y is the parameter indicating the deviation of the moving body having been obtained, $\theta$ is the parameter indicating the angle between the ideal route and the moving direction of the moving body, $a_i$ is a coefficient parameter, n is a positive integer, and $\alpha$ is a constant:

$$I=\int y^2+\alpha \sin^2\theta \, dt \quad \text{(Formula 1)}$$

$$y(t)=\Sigma_{i=0}^{n} a_i t^i \quad \text{(Formula 2)}.$$

6. The method according to claim 5, wherein:

in calculation of the path of the movement of the moving body, the following formula 3 is used to derive, on a basis of y at which I takes a minimal value, a parameter x indicating a position of the moving body in a direction in parallel with the ideal route:

$$x(t)=\int \sqrt{v^2-(dy/dt)^2} \, dt \quad \text{(Formula 3)}.$$

* * * * *